May 30, 1950          G. W. CRISE          2,509,482
THERMOSTATIC VALVE
Filed Aug. 7, 1946
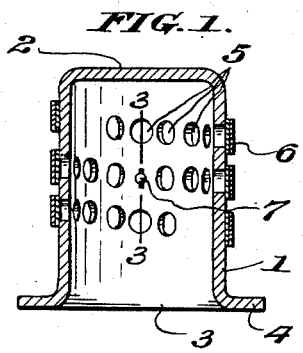
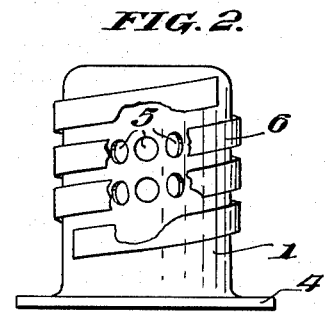
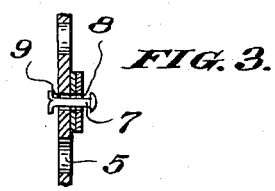
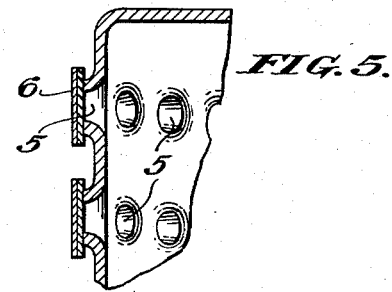
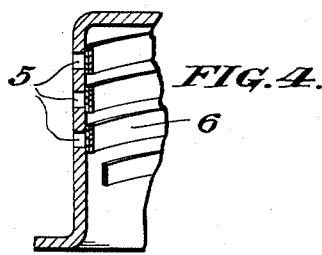
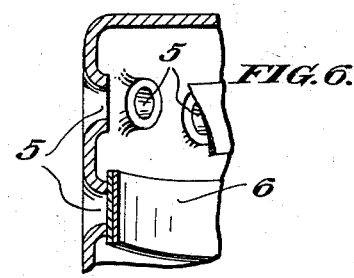
Inventor
George W. Crise
By W. S. McDowell
Attorney Patented May 30, 1950

2,509,482

UNITED STATES PATENT OFFICE 2,509,482

THERMOSTATIC VALVE

George W. Crise, Columbus, Ohio

Application August 7, 1946, Serial No. 689,006

10 Claims. (Cl. 236—34)

The object of this invention is to provide an improved thermostatic valve, and one primarily adapted for use in the cooling systems of automotive engines, the same, however, being adaptable to various other uses where moderate pressures are involved.

Heretofore, it has been customary to provide a valve of the mushroom or pocket type, actuated by a Sylphon bellows filled with a volatile liquid, to regulate the flow of water from an engine to an associated cooling radiator, whereby to substantially arrest thermal circulation of the cooling fluid during the period immediately following the starting of a cold engine, in order to accelerate the time required for the engine to attain a proper operating temperature. When such a condition has been attained, the cooling liquid also reaches a temperature sufficiently high to expand the liquid in the bellows to cause the opening of the associated valve, thus allowing the liquid engine coolant to circulate normally through the water jackets of an engine and the cooling radiator. While the valve is closed, the cooling water, which is under the light pressure of a centrifugal pump, is held in the cylinder block or radiator in a more or less static condition until the liquid in the bellows varies to expand the bellows and open the valve.

In modern engines, it is now customary to use pressure-sealed cooling systems in which a pressure of four to five pounds is attained before steam air or water can escape from the radiator. This is usually accomplished by a spring-loaded pop valve, and is particularly beneficial in conserving water when driving at high altitudes and in periods of hot weather, since such solutions as water and alcohol are lost at relatively moderate temperatures unless a pressure is maintained thereon.

With the conventional type of expanding bellows, the pressure generated within the cooling system opposes the expansion of the thermostatic bellows at the very time it should be free to provide maximum valve opening to afford the greatest possible free circulation of the water. The greatest drawback to the bellows-operated valve, however, is the high percentage of failures resulting from leaks which develop as a result of the flexing of the bellows itself. Such leaks make the bellows-type valve inoperative, causing the engine in which it is installed to overheat. Steam is then generated in the motor block displacing the cooling water, and the engine may be seriously damaged before the vehicle operator realizes that his car should not be operated until the defective thermostat is removed.

In addition to the bellows-type radiator thermostat under consideration, valves of the rotating vane or damper types have been proposed, using bimetallic expansion and contraction elements as an actuating means, but due to their construction, they have lacked sufficient power for dependable operation and, moreover, their cost is excessive due to the intricacy of their mechanical design.

In the present invention, I utilize a helical coil of bimetal as a combination actuator and valve element, and I also employ the well known snubbing action of a wrapped coil to increase the effective holding power of my improved valve.

For a further understanding of the invention, and additional objects and advantages thereof, reference is to be had to the following description and the accompanying drawing, wherein:

Fig. 1 is a vertical sectional view taken through the thermostatic valve comprising a preferred form of the present invention;

Fig. 2 is a side elevational view thereof, with portions of the bimetallic coil broken away to disclose underlying structure;

Fig. 3 is a detail sectional view on the plane indicated by the line 3—3 of Fig. 1;

Fig. 4 is a similar view disclosing a modified form of the invention in which the bimetallic coil is arranged on the inside of the valve casing;

Fig. 5 is a fragmentary vertical sectional view disclosing a further modified form of the invention in which the openings in the valve casing or cup are provided with outwardly extending lips, and with the bimetallic coil arranged exteriorly thereof;

Fig. 6 is a similar view disclosing the lips of the cup openings extending inwardly, and with the bimetallic coil arranged inside the cup in contact with said lips.

Referring more particularly to the drawing there is disclosed at 1 a drawn brass cup, which constitutes the casing or body member of the valve. This cup is closed at one end as at 2, and its opposite end is open as at 3, the open end terminating in an outwardly extending annular flange 4, which constitutes a seat in order that the cup may be clamped in the thermostat chamber, not shown, of a conventional automobile motor in accordance with present mounting practice.

The cup 1 is perforated with a helically arranged row of openings 5, the latter being so spaced as to be completely covered by a helically wound bimetallic ribbon 6. In Fig. 1, the ribbon has been shown as arranged exteriorly of the cup, with its inner surfaces in firm contact with the exterior surfaces of the cup so as to close all the openings against fluid passage. To hold the bimetallic ribbon in place, a small split rivet 7 may be used. This rivet passes through the registering openings 8 and 9 formed respectively in the ribbon and the cup. The opening 8 is disposed substantially midway of the total length of the rivet. The shank of this rivet is quite small but is sufficiently long to permit free movement of the bimetallic ribbon as it wraps and unwraps around the cup in response to temperature variations.

In Fig. 4, the ribbon has been shown as arranged inside the cup, rather than outside the same, as in Fig. 1. When used inside the cup, the elements of the bimetallic ribbon are so arranged that the ribbon expands and closes the openings 5 when the ribbon is at a low temperature, and contracts to open said openings and provide for fluid circulation therethrough when the temperature of the bimetallic element is increased. A reverse condition exists when the bimetallic element is arranged exteriorly of the cup, since in this case the ribbon contracts when cooled to close the openings 5 and expands when heated.

To minimize surface contact between the bimetallic ribbon and the cup, the latter may be formed, as shown in Fig 5, so that outwardly directed circular flanges are present around the openings 5. This construction is used in order to prevent small particles of foreign solids from wedging between the ribbon and the surfaces of the cup, and thereby interferring with the desired action of the bimetal. In Fig. 6, the same construction is present except that the opening flanges are directed inwardly of the cup, rather then outwardly, for contact with an inwardly positioned bimetallic element. It will be obvious that when the thermostatic valve is operatively mounted in an engine, with a tight seal around the flange 4, any fluid or circulating water must pass through the openings 5 in order to move from the cylinder block of an engine to the cooling radiator.

Referring to Figs. 1 and 2, let it be assumed that the cup is mounted in the outlet from the cylinder head on a cold motor, and that the bimetallic element is so formed as to wind tightly about the cup 1 at temperatures below 160° F. Now, starting the motor will cause the water to warm, heating the cup 1 and the bimetallic element 6. When a temperature of 150° F. is reached, the tension of the bimetallic element will have relaxed sufficiently so that water may start to seep through the openings 5. However, below this temperature and due to the fact that the ends of the bimetallic element do not cover openings and are therefore not subject to fluid pressure, a strong snubbing action is present. Variation in the amount of this holding force may be had by varying the length of the snubbing portions of the bimetallic element. As the temperature of the water increases to around 160° F., the valve responds to permit a free flow of water therethrough. Under such conditions, the so-called snubbing action of the thermostatic element has been relaxed. Thus, a sudden burst of engine power and speed, causing the water pump of the engine to increase pressure, will be accompanied by a flexing of the bimetallic element, allowing an increase in water flow even before an increased motor temperature has been transmitted to the cooling water.

In the construction illustrated in Figs. 4 and 6, such a sudden increase in water pressure to close the valve, and it will be understood that this opening or closing tendency depends on whether the bimetallic element is on the same or opposite side of the cup as the source of pressure.

Referring again to Figs. 5 and 6, showing the flanged openings, it will be understood that such designs are used where small leakages are objectionable, or when foreign or solid matter is present in the motor coolant, since, in conventional practice, with liquid bellows-operated valves a small leakage opening is drilled through the valve to provide a minimum water flow even under cold motor conditions.

From the above description, it will be manifest that my improved thermostatic valve, when manufactured from non-rusting metals, has the advantage of being highly dependable, of unlimited life and low manufacturing costs.

I claim:

1. A thermostatic valve comprising a casing, perforations in the casing for the flow therethrough, and a bimetallic helical strip supported on said casing and so positioned as to open and close said perforations by direct contact with the walls of said casing in automatic response to temperature variations, the length of the strip being such that the ends thereof project beyond the perforation for gripping engagement with the walls of the casing.

2. A thermostatic valve comprising a tubular casing open at one end and closed at its other, the walls of said casing between the ends thereof being formed with a row of openings, a helical bimetallic strip operative at normal temperatures to close said openings by direct contact with the wall surfaces of the casing around said openings and at relatively elevated temperatures to separate from the walls of said casing sufficiently to provide for the transmission of fluid through said openings, and means for securing said bimetallic strip intermediately of its ends to said casing, said securing means being such as to avoid any interference with the expansion and contraction of the bimetallic strip in its response to temperature variations.

3. A thermostatic valve for controlling water circulation in the cooling systems of internal combustion engines, comprising a cup-shaped body having a side wall formed with a row of helically arranged relatively spaced openings, and a helical bimetallic coil secured intermediately of its length to said body, the temperature characteristics of said coil being such that when the same possesses a relatively low temperature, the coil engages said body to preclude fluid passage through said openings and when at relatively elevated temperatures, said coil will be sufficiently spaced from said body to provide for fluid passage through said openings.

4. A thermostatic valve for controlling water circulation in the cooling systems of internal combustion engines, comprising a cup-shaped body having a side wall formed with a row of helically arranged relatively spaced openings, and a helical bimetallic coil secured intermediately of its length to said body, the temperature characteristics of said coil being such that when the same possesses a relatively low temperature, the coil engages said body to preclude fluid passage through said openings and when at relatively elevated temperatures, said coil will be sufficiently spaced from said body to provide for fluid passage through said openings, the ends of said coil being sufficiently extended beyond said row of openings to form snubbing extensions.

5. A thermostatic valve for the cooling systems of automotive engines, comprising a cup-shaped body formed with a helically arranged row of relatively spaced openings, and a helical bimetallic strip secured intermediately of its length to said body and arranged exteriorly of the latter, the flexing characteristics of said strip in response to temperature variations being such that when the strip possesses a reltively low temperature, the same contracts about the exterior of said body in registration with said openings to close the latter against fluid passage, and when the strip has been heated to a relatively elevated temperature, the same will expand sufficiently to provide for fluid circulation through said openings.

6. A thermostatic valve for the cooling systems of automotive engines, comprising a cup-shaped body formed with a helically arranged row of relatively spaced openings, and a helical bimetallic strip secured intermediately of its length to said body and arranged exteriorly of the latter, the flexing characteristics of said strip in response to temperature variations being such that when the strip possesses a relatively low temperature, the same contracts about the exterior of said body in registration with said openings to close the latter against fluid passage, and when the strip has been heated to a relatively elevated temperature, the same will expand sufficiently to provide for fluid circulation through said openings, the ends of said strip being terminated beyond the end openings of said row of openings to form snubbing extensions.

7. A thermostatic valve for engine cooling systems comprising a cup-shaped body closed at one end and open at its other, the open end being formed with an out-turned seating flange, said body in the side thereof being formed with a helically arranged row of openings, and a helical coiled bimetallic strip disposed within said body and secured to the latter so that when the strip possesses a relatively low temperature, the same expands into open-seating engagement with said body and when the strip possesses a relatively high temperature, the same contracts to assume a position sufficiently spaced from the walls of said body to provide for fluid flow through said openings.

8. A thermostatic valve as defined in claim 5, and wherein the openings in the body are surrounded by annular outwardly projecting lips adapted for limited surface contact with the bimetallic strip.

9. A thermostatic valve as defined in claim 7, and wherein the openings in the body thereof are formed with inwardly projecting annular flanges disposed for edge engagement with the bimetallic strip.

10. A thermostatic valve for the cooling systems of automotive engines comprising a cup-shaped body formed with a helically arranged row of relatively spaced openings, and a helical bimetallic strip secured intermediately of its length to said body, the length of said strip being such as to cause said strip to possess a plurality of convolutions in forming the coil, the temperature characteristics of such coil being such that when the same possesses a relatively low temperature, the coil engages said body to preclude fluid passage through said openings, and when at relatively elevated temperatures the thermal elongation and contraction properties of said coil will be sufficient to space the latter from said body to provide for fluid passage through said openings, the multiple convolutions of said coil being sufficiently extended beyond said row of openings to form snubbing extensions.

GEORGE W. CRISE.

REFERENCES CITED

The following references are of record in the file of this patent:

UNITED STATES PATENTS

| Number | Name | Date |
|---|---|---|
| 273,757 | Morel | Mar. 13, 1883 |
| 857,452 | Farmer | June 18, 1907 |
| 1,058,290 | Corey | Apr. 8, 1913 |
| 1,864,787 | Williams | June 28, 1932 |
| 1,968,553 | Heitger | July 31, 1934 |
| 2,098,252 | Lund | Nov. 9, 1937 |
| 2,221,750 | Ashby | Nov. 19, 1940 |